(12) United States Patent
Jinno et al.

(10) Patent No.: US 6,774,957 B2
(45) Date of Patent: Aug. 10, 2004

(54) DISPLAY APPARATUS HAVING AN ELECTRIC SHIELDING WIRE AND METHOD FOR MANUFACTURING THE SAME

(75) Inventors: Yushi Jinno, Gifu (JP); Kyoko Hirai, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/160,312

(22) Filed: Sep. 25, 1998

(65) Prior Publication Data

US 2001/0055085 A1 Dec. 27, 2001

(30) Foreign Application Priority Data

Sep. 26, 1997 (JP) ............................................. 9-261932

(51) Int. Cl.[7] ...................... G02F 1/1333; G02F 1/1345
(52) U.S. Cl. ......................................... 349/40; 349/151
(58) Field of Search .................. 349/40, 192, 147–148, 349/151; 344/370

(56) References Cited

U.S. PATENT DOCUMENTS

| | | | | |
|---|---|---|---|---|
| 5,187,604 A | * | 2/1993 | Taniguchi et al. ........... | 349/152 |
| 5,247,375 A | * | 9/1993 | Mochizuki et al. .......... | 349/151 |
| 5,517,344 A | * | 5/1996 | Hu et al. ..................... | 349/153 |
| 5,671,026 A | * | 9/1997 | Shiraki et al. ................ | 349/40 |
| 5,701,167 A | * | 12/1997 | Yamazaki ..................... | 349/42 |
| 5,739,880 A | * | 4/1998 | Suzuki et al. ................ | 349/110 |
| 5,748,179 A | * | 5/1998 | Ito et al. ...................... | 349/152 |
| 5,764,320 A | * | 6/1998 | Konuma et al. .............. | 349/40 |
| 5,777,702 A | * | 7/1998 | Wakagi et al. ................ | 349/47 |
| 5,811,318 A | * | 9/1998 | Kweon ......................... | 438/30 |
| 5,926,234 A | * | 7/1999 | Shiraki et al. ................ | 349/40 |
| 5,949,502 A | * | 9/1999 | Matsunaga et al. ........... | 349/40 |
| 5,973,658 A | * | 10/1999 | Kim et al. .................... | 345/92 |
| 6,081,307 A | * | 6/2000 | Ha ............................... | 349/40 |
| 6,201,590 B1 | * | 3/2001 | Ohta et al. ................... | 349/141 |
| 6,337,722 B1 | * | 1/2002 | Ha ............................... | 349/40 |

FOREIGN PATENT DOCUMENTS

| | | | |
|---|---|---|---|
| JP | 03249624 | * | 11/1991 |
| JP | 03290623 | * | 12/1991 |

* cited by examiner

Primary Examiner—Kenneth Parker
(74) Attorney, Agent, or Firm—Hogan & Hartson, LLP

(57) ABSTRACT

An electric shielding wire made of Cr is provided near the edge of a substrate, in which the electric shielding wire is a lower electric layer for an TFT element. Because countermeasures against static electricity are taken at an early manufacturing stage of the substrate, the elements formed on the substrate are protected against damage due to static electricity generated in subsequent stages. The electricity shielding wire is ultimately used as a pedestal for a wire. With this arrangement, characteristics of various elements of a driver-integrated LCD are protected against deterioration due to static electricity generated in a manufacturing process.

3 Claims, 13 Drawing Sheets

DISPLAY APPARATUS HAVING AN ELECTRIC SHIELDING WIRE AND METHOD FOR MANUFACTURING THE SAME

BACKGROUND OF THE INVENTION

1. Field of the Invention

The present invention relates to a liquid crystal display (LCD) and to a method for manufacturing such LCDs, and in particular to a peripheral driving circuit integrated LCD in which a thin film transistor (TFT) is used as a switching element in a display area and a driving circuit is formed around the display area, and a method for manufacturing the same. The manufacturing method of this invention prevents dielectric breakdown of an element due to static electricity generated in the manufacturing process.

2. Description of the Related Art

LCDs are commonly employed in office automation and audio visual apparatuses because of their advantageously small size, thin shape, and low power consumption. In particular, active matrix LCDs employing a TFT for a switching element to control writing of pixel information into pixels, are used for displays of various television sets or personal computers as they can precisely display motion pictures on a large screen.

A TFT is a field effect transistor (FET) made by forming metallic and semiconductor layers of a predetermined shape on a insulating substrate. In an active matrix LCD, the TFT is connected to the pixel electrodes for driving liquid crystal. Note that a common electrode, a pixel electrode, and liquid crystal sandwiched by these, together constitute a capacitor which corresponds to one pixel.

In recent years, an LCD has been developed which employs polysilicon (p-si) for the semiconductor layer, instead of amorphous silicon which was mainly used. Laser light is used to anneal, form, and grow p-Si crystal. In general, p-Si is superior in carrier movability to a-Si, and achieves TFT size reduction which enables formation of a highly precise, fine LCD with a higher opening rate. Moreover, when a gate self-align structure enables formation of a fine structure, and reduced parasitic capacitance enables high-speed processing, it is possible to form a high speed driving circuit through employment of an electric complementary structure which uses an n-ch TFT and a p-Ch TFT, i.e., CMOS. This further allows formation of a driving circuit around a pixel area on the same substrate, so that manufacturing costs and the size of an LCD module can be reduced.

Referring to FIG. 11, which is a plan view of a mother substrate 1 of the aforementioned driver-integrated LCD, the mother substrate 1 includes four active matrix substrates 2 which constitute electrode substrates of LCDs on one. On each active matrix substrate 2, respective areas are reserved for formation of a display area at the center, gate driver 40 on the left and right sides thereof, a drain driver thereabove, a precharge driver 6 therebelow, an input terminal area 7 along the lower edge of the substrate 2. The input terminal area 7 is connected to a flexible print connector (FPC), which is mounted with an integrated circuit for generating a control signal to be supplied via the FPC to the input terminal area 7.

From the input terminal area 7, a vertical clock pulse feeding wire 41 and a vertical start pulse feeding wire 42 extend to the gate driver 4; a horizontal clock pulse feeding wire 51, a horizontal start pulse feeding wire 52, and a video data feeding wire 53 extend to the drain driver 5; and a horizontal clock pulse feeding wire 61 and a horizontal start pulse feeding wire 62 extend to the precharge driver 6.

After an opposing glass substrate is attached to the motor substrate 1, the substrate 1 is cut along the break line 8 into four sheets of active matrix panels. Note that the opposing glass substrate has common electrodes formed thereon correspond to the substantial area of each active matrix substrate.

Referring to FIG. 12 which is an enlarged plan view of an active matrix substrate 2, a display area 3 is formed such that horizontally extending gate lines 31 intersect vertically extending drain lines 32, and a switch element 33 is provided at each crossing, connected to the pixel electrode for driving crystal liquid.

A gate driver 4 mainly comprises a shift register for supplying a scanning signal voltage to the gate lines 31 in response to a vertical clock pulse. A drain driver 5 mainly comprises a shift register and a sampling gate for supplying a display signal voltage to the drain lines 32 in response to a horizontal clock pulse.

A precharge driver 6, comprising mainly a shift register, is provided, when necessary, to supply the display signal voltage to the drain lines 32 earlier than the drain driver 5 to eliminate residual voltage in the drain lines 32 since previous scanning periods.

In the input terminal area 7, input terminals 71 are arranged respectively connected to the wires 41, 42, 51, 52, 53, 61, 62.

Each switch element 33 comprises, for example, a TFT, and all switch elements 33 in the same row are collectively turned on by a scanning signal voltage, in synchronism with which the display signal voltage is applied from the drain lines 32 to each pixel electrode 34. By using the applied voltage as display information, permeability of liquid crystal in each pixel is controlled so as to display an image using bright and dark pixels.

A driver for the aforementioned driver-integrated LCD is made by forming a p-Si (polysilicon) TFT on a substrate. That is, a CMOS is formed using a pair of TFTs each having the same structure as that of a TFT used for a switch element 33 in the display area so that a number of inverter circuits are formed on a single substrate, forming respective drivers 4, 5, 6.

Referring to FIG. 13, which is a cross sectional view of major elements of the aforementioned active matrix substrate 2, from left to right in the drawing are shown a TFT area, a wire 41, 42, 52, 52, 53, 61, 61 area, and an input terminal 71. On a glass substrate 100, a gate electrode 101 and an input terminal pedestal 121 are formed as a first conductive layer made of Cr or the like. Above them, a gate insulating film 102, a p-Si film 103, an injection stopper 104, an interlayer insulating film 105, a source electrode 106, a drain electrode 107, a wire 116, an input terminal 126, a flattening insulating film 108, a pixel electrode 109, and an input terminal contact film 129 are formed. The source electrode 106, the drain electrode 107, the wire 116, and the input terminal 126 are made of Al or the like to serve as a second conductive layer; the pixel electrode 109 and the input terminal contact film 129 are made of indium tin oxide (ITO).

As can be seen from this drawing, the input terminal 71 has a three-layer structure including an input terminal pedestal 121, an input terminal 126, and an input terminal contact film 129. The input terminal 126, integrated with the wire 116, is made of a highly conductive Al or the like, which, however, is inferior in property of attaching to the substrate 100. Therefore, an input terminal pedestal 121 made of Cr, which adheres well to both Al and glass, is provided as a base of the input terminal 126 to ensure rigid adherence between the input terminal 126 and the substrate 100.

Because anisotropy conductive resin used as an adhesive member with an FPC is not easily used with the input terminal 126, an input terminal contact film 129 made of ITO is intervened so as to ensure better adherence with the FTC.

First, a gate line 31, a gate electrode 101, and an input terminal pedestal 121 may be formed. That is, a gate electrode 101 for a switching element and a gate line 31 integrated with the gate electrode 101 are formed in the display area 3; a gate electrode 101 for a CMOS TFT and lower wires for wire bonding are formed in the driver areas 4, 5, 6; and a pedestal 121 for an input terminal 71 is formed in the input terminal area 7. A source electrode 106, a drain electrode 107, drain lines 32, and wires 41, 42, 51, 52, 53 are not yet formed.

As can be seen from the structure shown in FIG. 3, in manufacturing an active matrix substrate, a lower electrode wire layer including a gate electrode 101 and an input terminal pedestal 121 are formed at the first stage, followed by many stages at which a p-Si film 103 and various insulating films 102, 104, 106 are formed and etched and further by subsequent stages at which an upper electrode wire layer including a source electrode 106, a drain electrode 107, and a wire 116, are formed. Through these stages, static electricity may be caused by friction with the mother substrate 1, particularly near the edges of the substrate. Especially, if an island-shaped input terminal pedestal 121 is charged, charged electricity is discharged toward the surrounding metal. Specifically, referring to FIG. 11, for example, TFT elements constituting a precharge driver 6 and a drain driver 5 of the adjacent active matrix substrate 2 are subject to the influence of the discharged electricity from the input terminal area 7 as they are positioned close to the input terminal area 7, especially at a stage with a gate electrode 101 formed. Discharged static electricity would deteriorate the element characteristics and cause dielectric breakdown, particularly at a stage where a p-Si film 103 has been formed.

Drain drivers 5 on the upper active matrix substrates 2 in FIG. 11 are also more likely affected by the static electricity as they are positioned near the edge of the mother substrate 1, i.e., close to a part touched by a man's hand or a supporting section of a device.

SUMMARY OF THE INVENTION

The present invention has been conceived to with an aim of preventing deterioration of element characteristics due to static electricity generated in manufacturing.

According to the present invention, a conductive section is formed for discharging electricity, when forming a TFT so that the static electricity generated at the edges of a substrate is absorbed and shielded by the conductive section. With this arrangement, breakdown of the TFT due to static electricity is prevented.

Particularly, a conductive section formed near the edge of the substrate could effectively prevent the TFT from breakdown.

Further, the conductive section may preferably be formed as a part of a wire arranged on the substrate. Also, an input terminal constructed to serve as a conductive section may be used to effectively prevent a TFT from breakdown due to static electricity even though the lower layer of the input terminal is charged with static electricity.

Still further, a conductive section formed on the mother substrate may be used to prevent a TFT from breakdown due to static electricity generated in the mother substrate. Also, when an unnecessary conductive section is disposed of, a finished display apparatus is not affected by the conductive layer as it does not include the conductive layer.

BRIEF DESCRIPTION OF THE DRAWINGS

The above and other objects, features, and advantages, will become further apparent from the following description of the preferred embodiment taken in conjunction with the accompanying drawings wherein.

DESCRIPTION OF THE PREFERRED EMBODIMENTS

Figure 1:
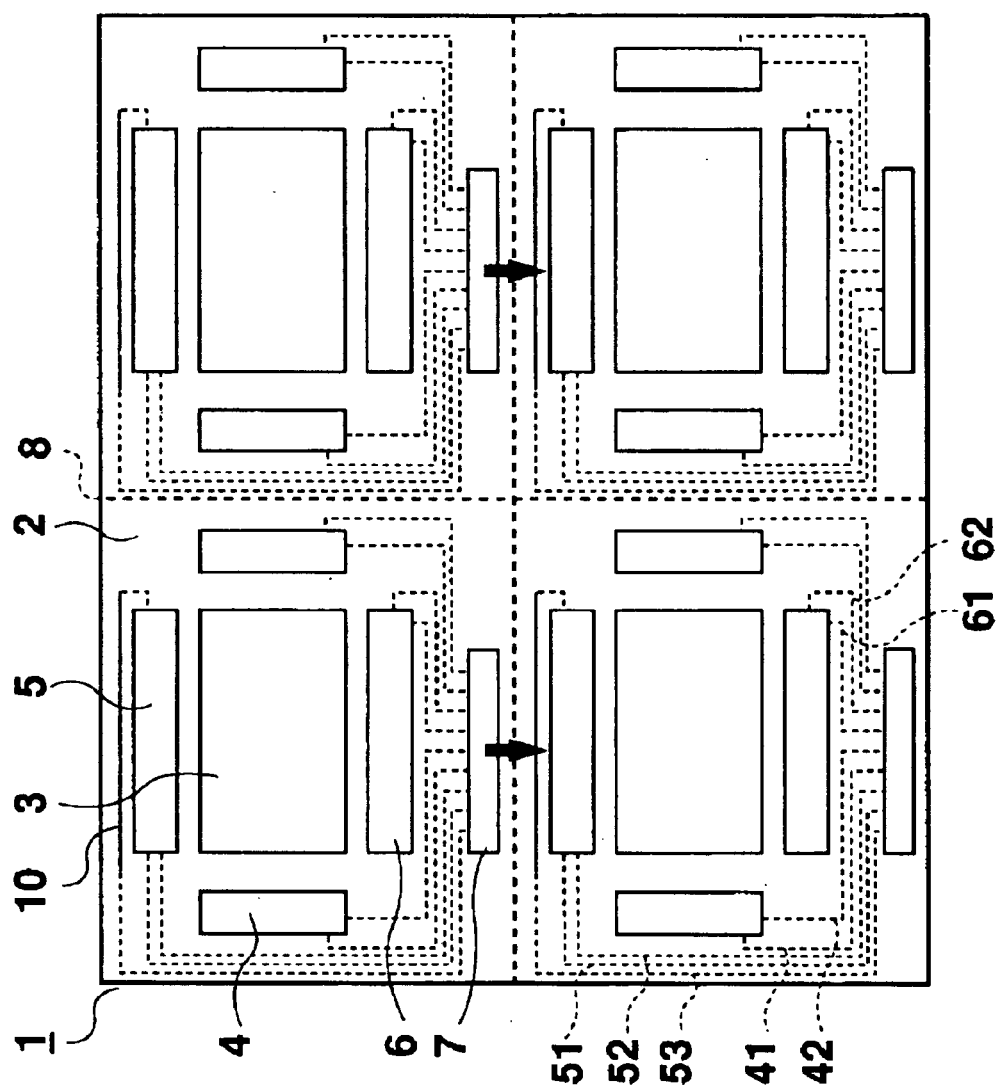
FIG. 1 is a plan view showing a mother substrate of a display apparatus according to a first preferred embodiment of the present invention.

FIG. 1 is a plan view showing a mother substrate 1 of a driver-integrated LCD according to a first preferred embodiment of the present invention. The mother substrate 1 includes two or more (four in this figure) active matrix substrates 2 which serve as an electrode substrate of LCDs on one side. On each active matrix substrate 2, respective areas are reserved for formation of a display area 3 at the center, a gate driver 4 on the left and right sides thereof, a drain driver 5 above, a precharge driver 6 below, and an input terminal area 7 along the lower edge of the substrate 2.

Figure 2:
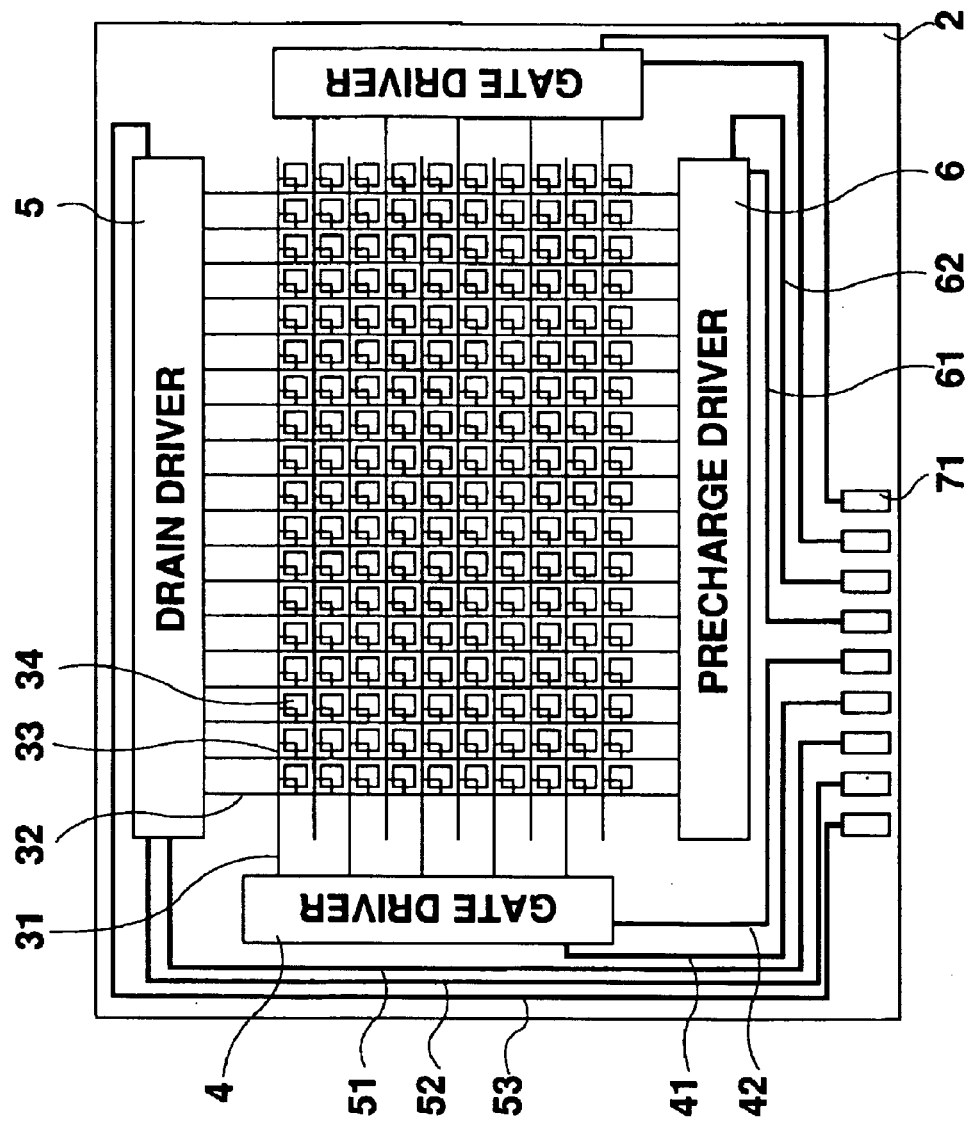
FIG. 2 is a plan view showing an active matrix substrate of a display apparatus according to the first preferred embodiment of the present invention.

Referring to FIG. 2, which is an enlarged plan view showing each active matrix substrate 2, a display area 3 is formed such that horizontally extending gate lines 31 intersect vertically extending drain lines 32, and a switch element 33 is provided at each crossing, connected to the pixel electrode 34.

The switch element 33 is a TFT. Each driver 4, 5, 6 has a CMOS structure including a TFT which is similarly structured as one for the switch element 33.

At the input terminal area 7, input terminals 71 are arranged for receiving signals such as a vertical clock pulse, a vertical start pulse, a horizontal clock pulse, a horizontal start pulse, a video data signal, and the like. From the input terminals 7, a vertical clock pulse feeding wire 41 and a vertical start pulse feeding wire 42 extend to the gate driver 4; a horizontal clock pulse feeding wire 51, a horizontal start pulse feeding wire 52, and a video data feeding wire 53 extend to the drain driver 5; and a horizontal clock pulse feeding wire 61 and a horizontal start pulse feeding wire 62 extend to the precharge driver 6.

In this embodiment, at least one of the wires connected to the drain driver 5, namely, at least one of the horizontal clock pulse feeding wire 51, the horizontal start pulse feeding wire 52, and the video data feeding wire 53, is arranged detouring around outside the drain driver 5, and an electric shielding wire 10 is provided at least to the part of the video data feeding wire 43 which passes close to and outside the drain driver 5 (indicated by a solid line in FIG. 1).

Figure 3:
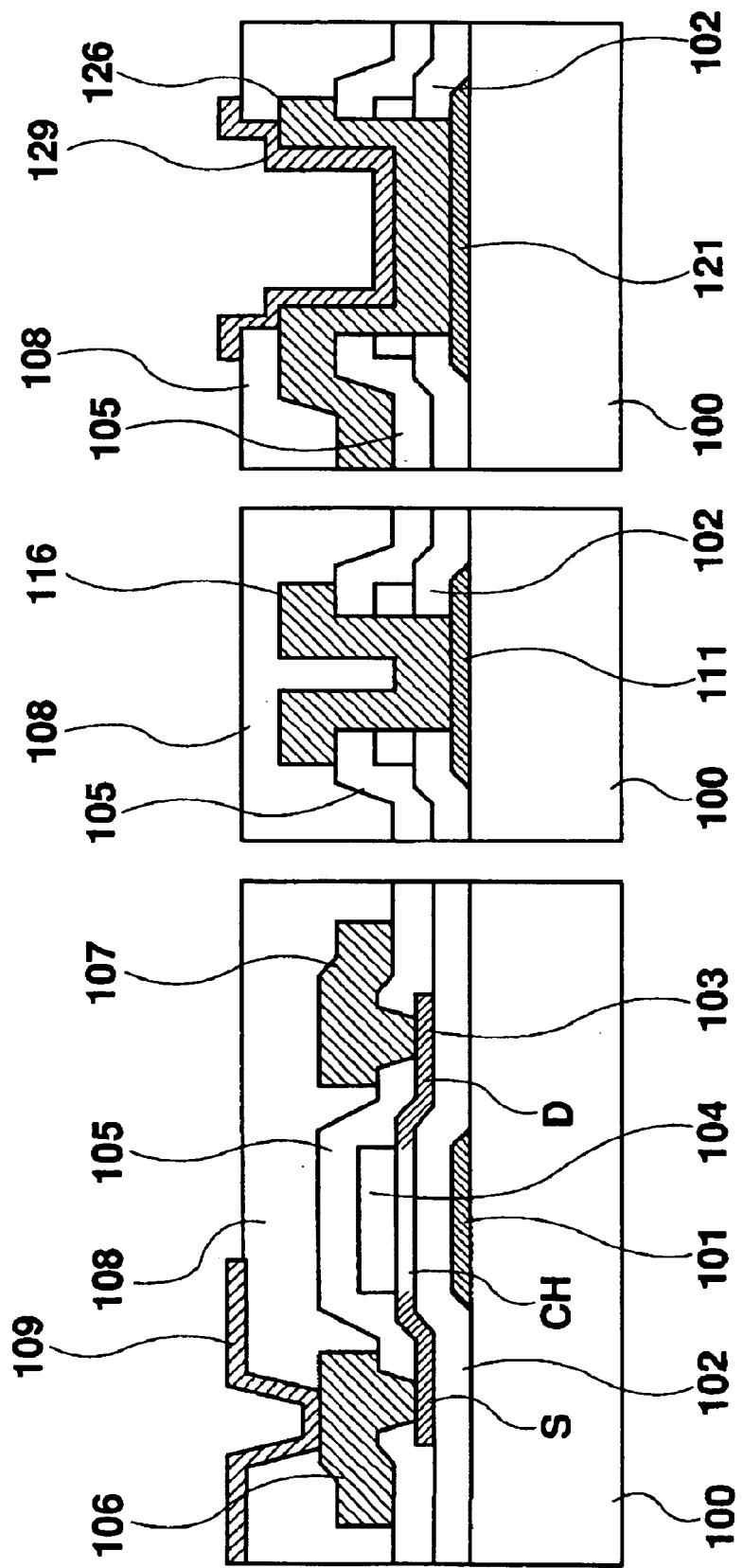
FIG. 3 is a cross sectional view showing significant portions of an active matrix substrate display apparatus according to a first preferred embodiment of the present invention.

Referring to FIG. 3, which is a cross sectional view showing major elements of the active matrix substrate 2, an TFT area, a wire 53 area, particularly a part thereof provided with an electric shielding wire 10, and an input terminal 71 area are shown from left to right of the drawing.

On a glass substrate 100, a gate electrode 101, a wire pedestal 111, and an input terminal pedestal 121 are formed as a first conductive layer made of a material such as Cr or the like. The gate electrode 101 is formed integrated with a gate line 31. The wire pedestal 121 serves also as an electric shielding wire 10. Covering all of the above, a gate insulating film 102 is formed.

In the TFT area, a p-Si film 103 is formed in an island-shape on the gate insulating film 102 above the gate electrode 101. The p-Si film 103 constitutes a non-doped channel region (CH) at a part directly above the gate electrode 101, and a source region S and a drain region D with impurities doped therein respectively at the left and right sides of the CH region. Further on the CH region, an injection stopper 104 is formed in a shape which is determined depending on the gate electrode 101. The injection stopper 104 serves as a mask in doping impurity ions. Covering all of the above, an interlayer insulating film 105 is formed. Further, a source electrode 106 and a drain electrode 107 are formed as a second conductive layer made of Al or the like such that they are respectively connected to the source region S and the drain region D via a contact hole formed piercing the insulating film 105.

A wire 116 is formed on the interlayer insulating film 105 as a second conductive layer made of Al or the like and the input terminal 126 of the wire 116 is formed connected to the input terminal pedestal 121 via a contact hole formed piercing the interlayer insulating film 105, the injection stopper 104, and the gate insulating film 102.

Further, in the TFT, wire, and input terminal areas, a flattening insulating film 108 is provided covering all of the layers mentioned above.

Still further, in the TFT area, a pixel electrode 109 made of ITO is formed on the flattening insulating film 108 so as to be connected to the source electrode 106 via a contact hole formed piercing the flattening insulating film 108.

In the input terminal area, an input terminal contact film 129 made of ITO is formed so as to be connected to the input terminal 126 via a contact hole formed piercing through the flattening insulating film 108.

A gate electrode 101, and a wire pedestal 111, and an input terminal pedestal 121 are first formed as a first conductive layer. At this stage, since at least one of the wires, e.g., a video data feeding wires 53, is to be arranged detouring around outside a region reserved for a drain driver 5, a wire pedestal 111 is formed on the substrate 2 at least at a part thereof where the wire 43 is to be arranged passing close to and outside the drain driver 5 so that the wire pedestal 111 serves as an electric shielding wire 10. That is, when the wire 53 is finally arranged, the wire 53 has a lamination structure comprising a wire pedestal 111 and a wire 116, as shown in FIG. 3, at the part thereof passing close to and outside the drain driver 5.

If static electricity is generated to the mother substrate 1 at a relatively early stage of the manufacturing process, the input terminal area 7 is particularly likely to be charged as is used for connection with the outside devices and thus generally provided along the edge of the active matrix substrate 2. Also, since the input terminal 7 is formed away from the precharge driver 6 in order to ensure a space between them to form wires 41, 42, 51, 52, 53, 61, 62, the input terminal 7 is resultantly positioned closer to the drain driver 5 of the adjacent active matrix substrate 2 than the precharge driver 6 of its own substrate 2. Furthermore, misoperation of the drain driver 5 more greatly effects deterioration of a displayed image than does misoperation of the precharge driver 6.

Static electricity tends to generate in the mother substrate 1 near its edges due to contact with base supporting sections of various processing devices and workers' hands in manufacturing or conveying process from one to another manufacturing processes. Naturally, the drain driver 5, formed near the edge of the motor substrate 1, is likely to be affected by static electricity.

Therefore, according to this invention, an electric shielding wire 10 is provided at an early manufacturing stage at a porton of an active matrix substrate 2 outside the drain driver 5, i.e., a part between the drain driver 5 and the input terminal area 7 of the adjacent substrate 2. With this arrangement, static electricity generated in the input terminal area 7 of the adjacent active matrix substrate 2 or the edge of its own mother substrate 1 during a manufacturing process is absorbed by the electric shielding wire 10 so that damage to the elements of the drain driver 5 due to static electricity can be prevented.

Despite the aforementioned structure, manufacturing costs do not increase since electric shielding wire 10 can be formed at the same time when the gate line 31 is formed.

Note that this device is not limited to configurations where the video data feeding wire 53 detours around outside the drain driver 5, and any other lines 41, 42, 51, 52, 61, 62 may be thus arranged if possible or preferable in terms of design layout.

The device is also not limited to configurations where it is the drain driver 5 that is protected by the electric shielding wire 10. With other layout arrangements of the display area 3, drivers 4, 5, 6, and an input terminal area 7, any drivers, such as a gate driver 4 and a precharge driver 6, which are arranged close to the input terminal area 7 of an adjacent active matrix substrate or at a part near the edge of its own substrate, can be protected against breakdown due to static electricity 1.

Figure 4:
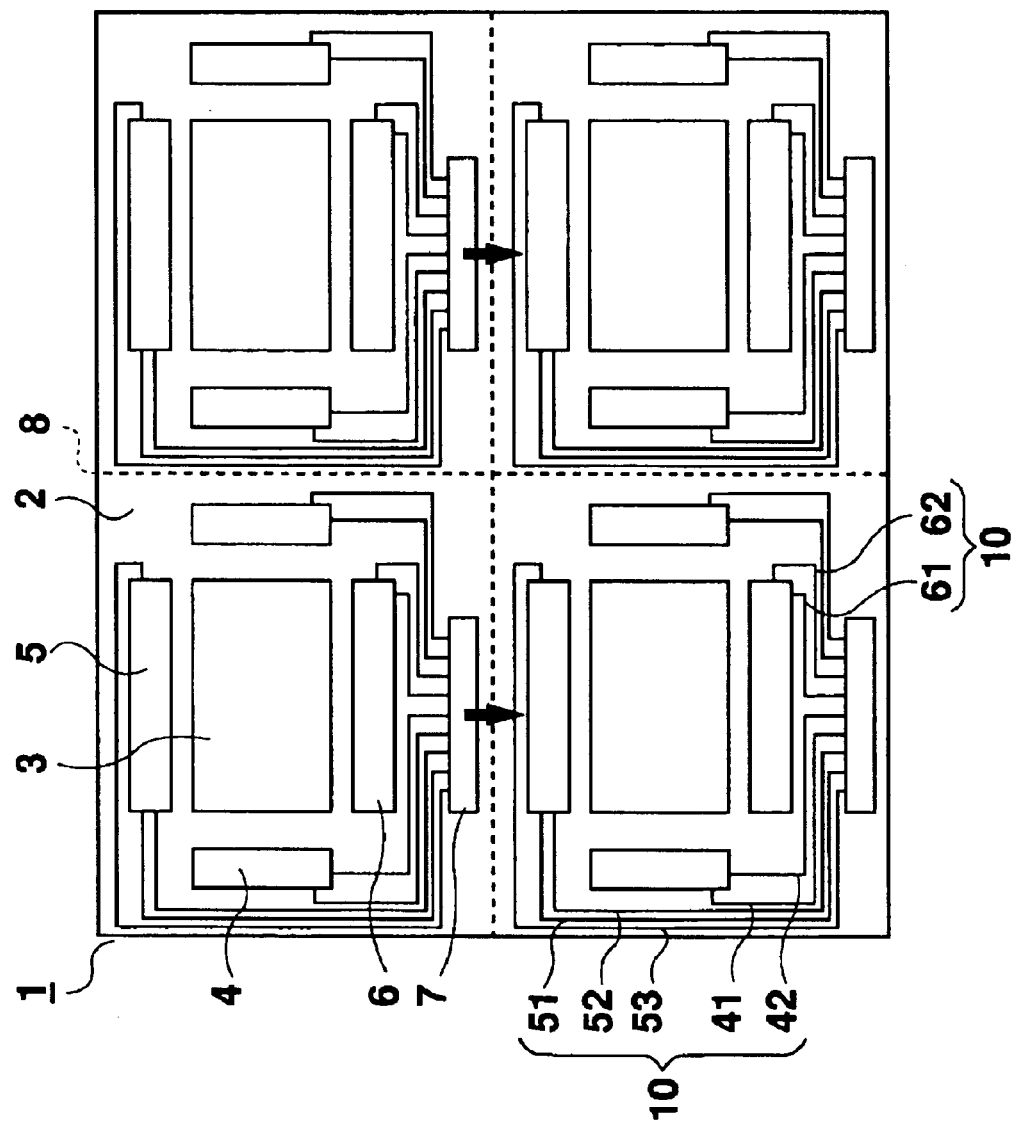
FIG. 4 is a plan view showing a mother substrate of a display apparatus according to a second preferred embodiment of the present invention.

Referring to FIG. 4, which is a plan view showing a mother substrate 1 of a driver-integrated LCD according to a second preferred embodiment of the present invention, similar to the first preferred embodiment, at least one of the wires 41, 42, 51, 52, 53, 61, 62, for example, the video data feeding wire 53, is arranged to detour around outside the drain driver 5. The difference from the first embodiment lies in the fact that the entire parts of the wires 41, 42, 51, 52, 53, 61, 62 are constructed having a lamination structure, as shown in FIG. 1, comprising a wire 116 and a wire pedestal 111.

Therefore, an electric shielding wire 10 comprising a wire pedestal 111 is formed corresponding to the entire part of the wires 41, 42, 51, 52, 53, 61, 62. With this arrangement, static electricity, if generated at the input terminal area 7 of the adjacent active matrix substrate 2 or anywhere near the edges of its own substrate 1, would be absorbed by the electric shielding wire 10 and discharged through diffusion, to thereby protect the gate driver 4, the precharge driver 6, the display area 3, and any other elements as well as the drain driver 5 on the mother substrate 1 against breakdown due to static electricity.

It should be noted that a modified arrangement of the above embodiment in which a video data feeding wire 53 arranged detouring around outside the drain driver 5, and the detouring part only, or substantially the entire portion thereof, is provided with an electric shielding wire 53 can enhance the effect of preventing breakdown due to static electricity.

Also, another modification in which an electric shielding wire 10 is formed as a part of the wires 51, 52, 53, 41, 42, 61, 62 in regions where the wires 51, 52, 53, 41, 42, 61, 62 pass close to and outside the gate driver 4 and/or the precharge driver 6, and an electric shielding wire 10 is formed as a part of the wires 41 and 41, 61 and 62 which are arranged detouring around outside the gate driver 4 and the precharge driver 6, respectively, can protect the gate driver 4 and/or the precharge driver 6 from breakdown due to static electricity generated near the edges of the mother substrate 1.

Figure 5:
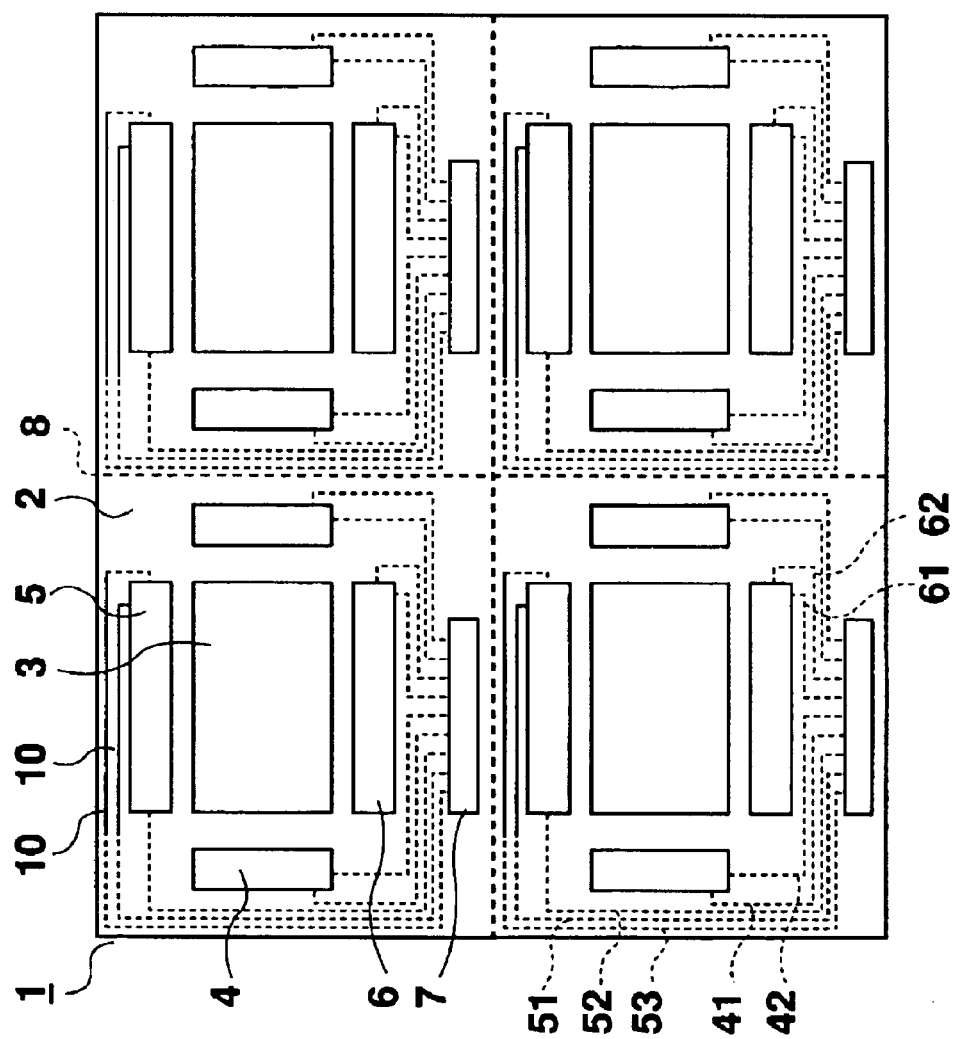
FIG. 5 is a plan view showing a mother substrate of a display apparatus according to a third first preferred embodiment of the present invention.

Referring to FIG. 5, which is a plan view showing a mother substrate 1 of a driver-integrated LCD according to a third preferred embodiment of the present invention, the video data feeding wire 53 and the horizontal clock pulse feeding wire 51 are arranged detouring around outside the drain driver 5, and an electric shielding wire 10 is provided to the wires 51, 53 in at least a region where they pass close to the drain driver 5. With this arrangement, two electric shielding wires 10 intervene between the drain driver 5 and the input terminal area 7 of the adjacent active matrix substrate 2, so that the drain driver 5 can be more strongly protected from damage due to static electricity.

It should be noted that an electric shielding wire 10 may be provided to not only the video data feeding wire 53 and the horizontal clock pulse feeding wire 51, but also to any other lines 41, 42, 52, 61, 62 if allowed in terms of design layout.

Alternatively, the electric shielding wire 10 may be provided to a substantial or entire portion of the wires 41, 42, 51, 52, 53, 61, 62, or to only that portion passing close to and outside the gate driver 4 and the precharge driver 6.

Figure 6:
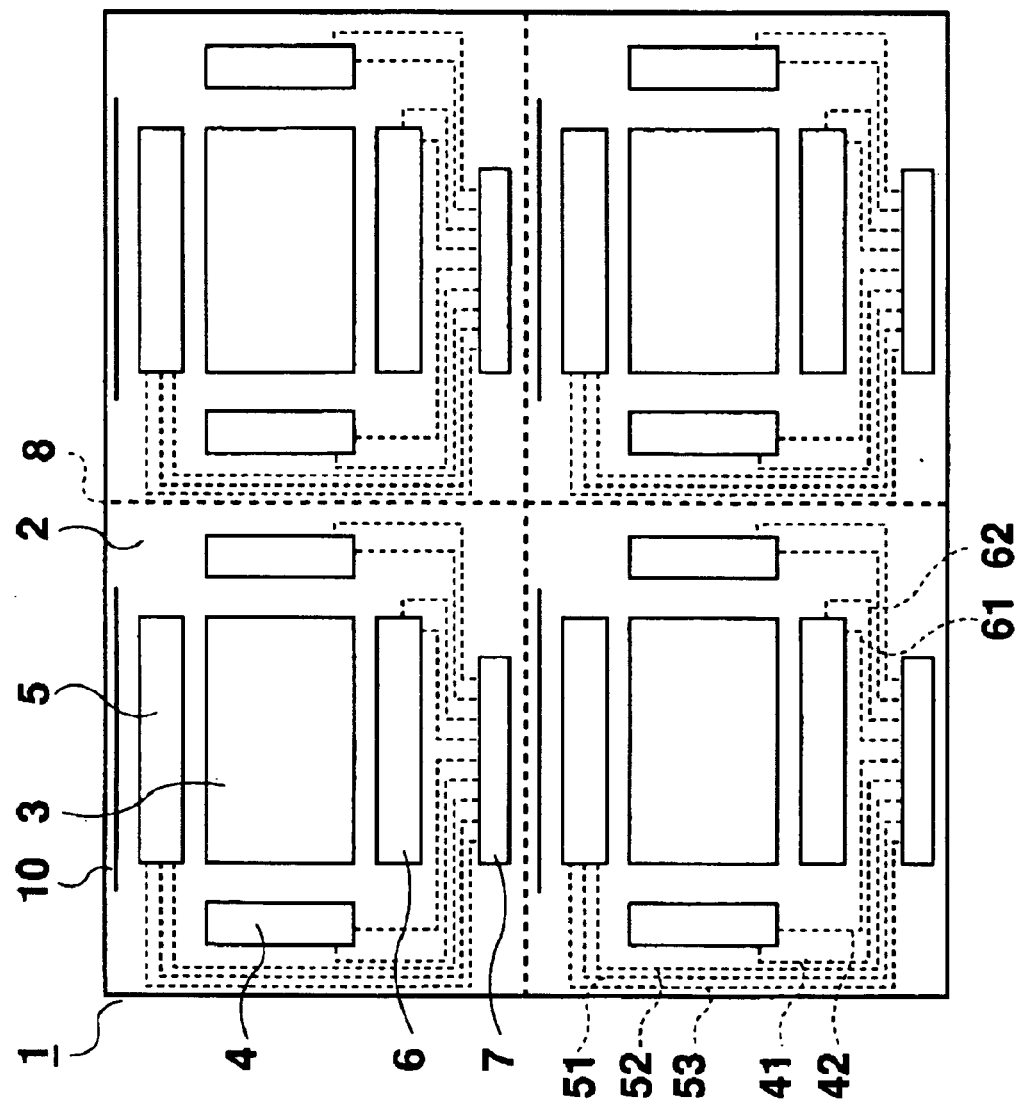
FIG. 6 is a plan view showing a mother substrate of a display apparatus according to a fourth preferred embodiment of the present invention.

Referring to FIG. 6 which is a plan view showing a mother substrate 1 of a driver-integrated LCD according to a fourth preferred embodiment of the present invention, an electric shielding wire 10 is provided close to and outside the drain driver 5 independent of the wires 41, 42, 51, 52, 53, 61, 62. This embodiment may be employed when the wire layout cannot easily be changed, as the wires 41, 42, 51, 52, 53, 61, 62 need not be arranged passing outside the drain driver 5 in this embodiment.

Alternatively, the electric shielding wire 10 may be arranged outside the gate driver 4 or the precharge driver 6.

Figure 7:
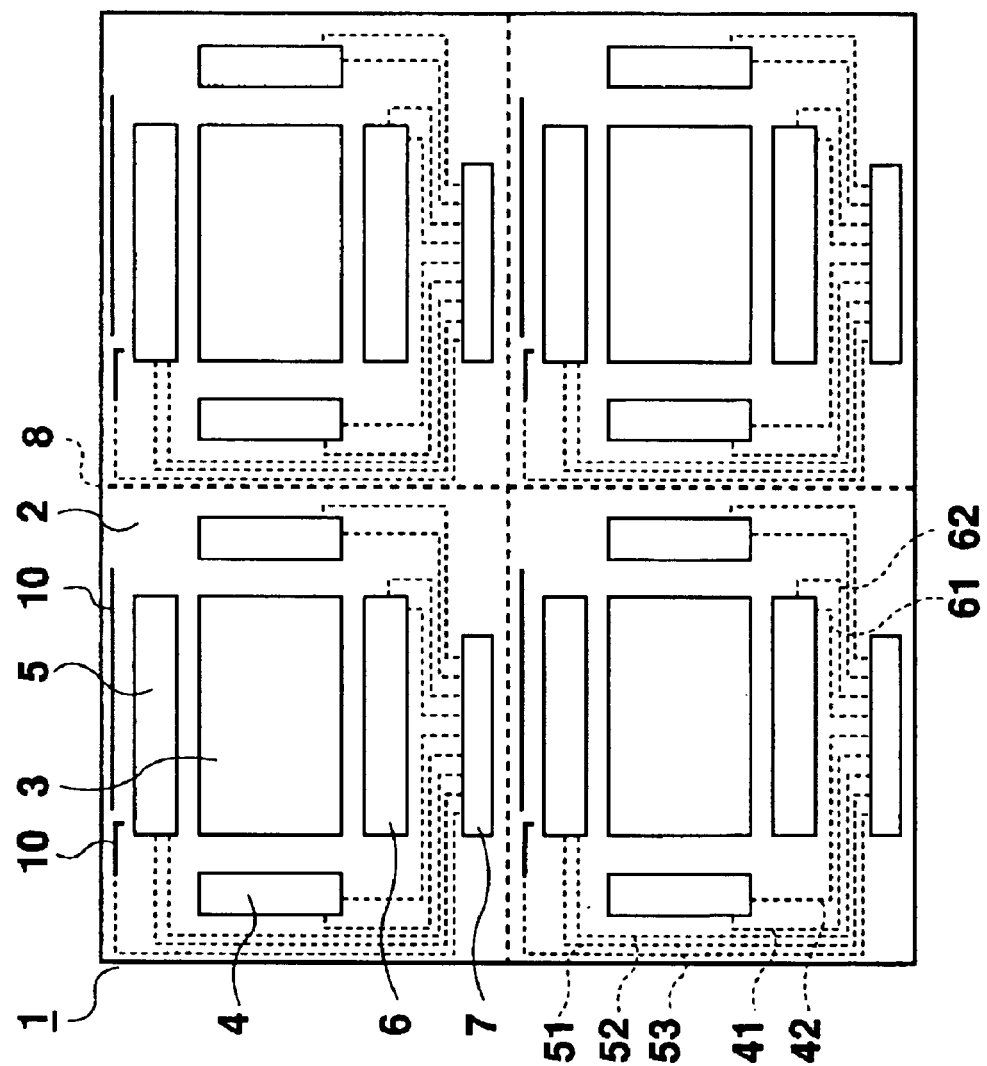
FIG. 7 is a plan view showing a mother substrate of a display apparatus according to a fifth preferred embodiment of the present invention.

Referring to FIG. 7 which is a plan view showing a mother substrate 1 of a driver-integrated LCD according to a fifth preferred embodiment of the present invention, an electric shielding wire 10 is provided independent of the wires 41, 42, 51, 52, 53, 61, passing close to and outside the drain driver 5, and also provided to a part of the video data feeding wire 53 passing close to and outside the drain driver 5. The resultant electric shielding wires 10 are arranged passing close to and substantially outside the drain driver 5, so that the drain driver 5 can be protected against static electricity generated in the input terminal area 7 of the adjacent active matrix substrate 2, or at a part near the edges of its own mother substrate 1. Similar to the fourth embodiment, this embodiment may also be employed when the wire layout cannot be easily changed.

Alternatively, an electricity shielding wire 10 may be provided to the substantial or entire part of the wires 41, 42, 51, 52, 53, 61, 62, or outside the gate driver 4 and/or (?) the precharge driver 6.

Figure 8:
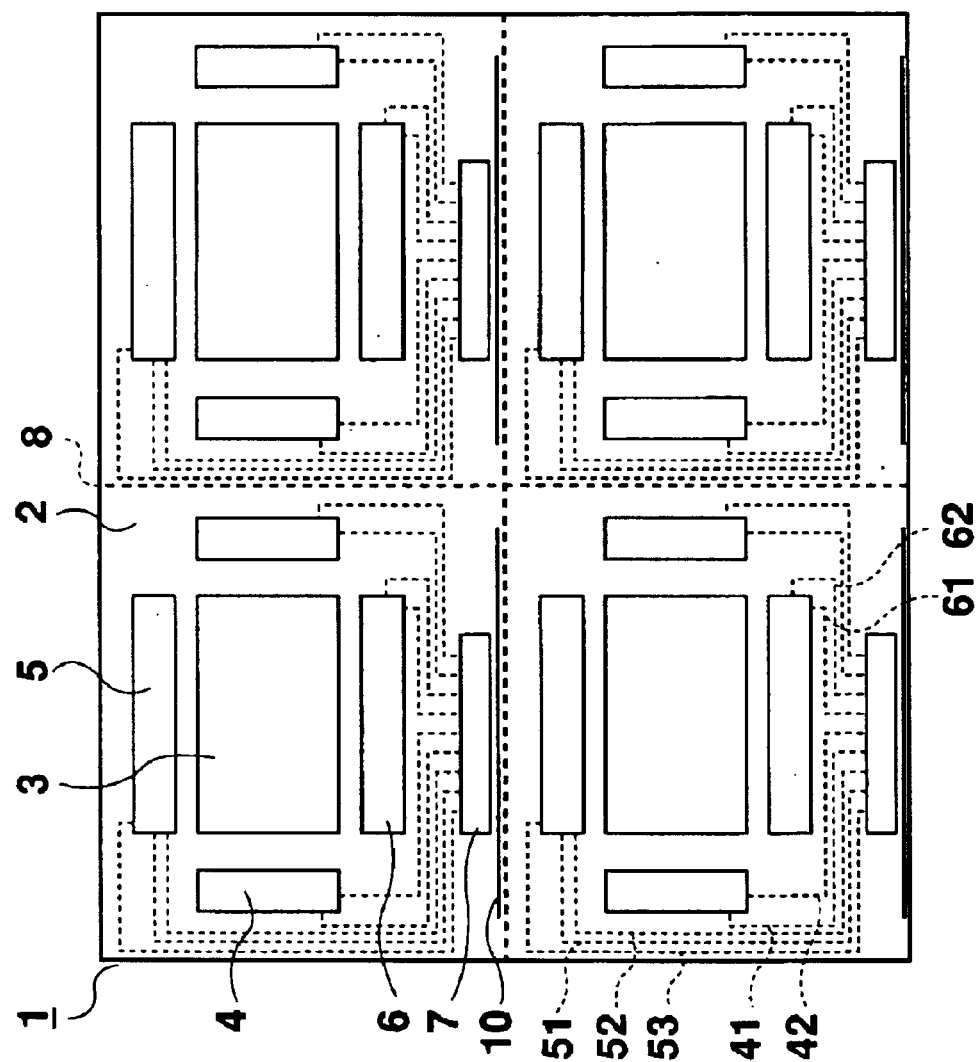
FIG. 8 is a plan view showing a mother substrate of a display apparatus according to a sixth preferred embodiment of the present invention.

Referring to FIG. 8, which is a plan view showing a mother substrate 1 of a driver-integrated LCD according to a sixth preferred embodiment of the present invention, an electric shielding wire 10 is provided outside the input terminal area 7, so that static electricity generated at the input terminal area 7 does not damage the drain driver 5 of the adjacent active matrix substrate 2. This embodiment may be employed when the wire layout cannot be easily changed or the wires 41, 42, 51, 52, 53, 61, 62 cannot be easily arranged so as to pass close to and outside the drain driver 5.

Figure 9:
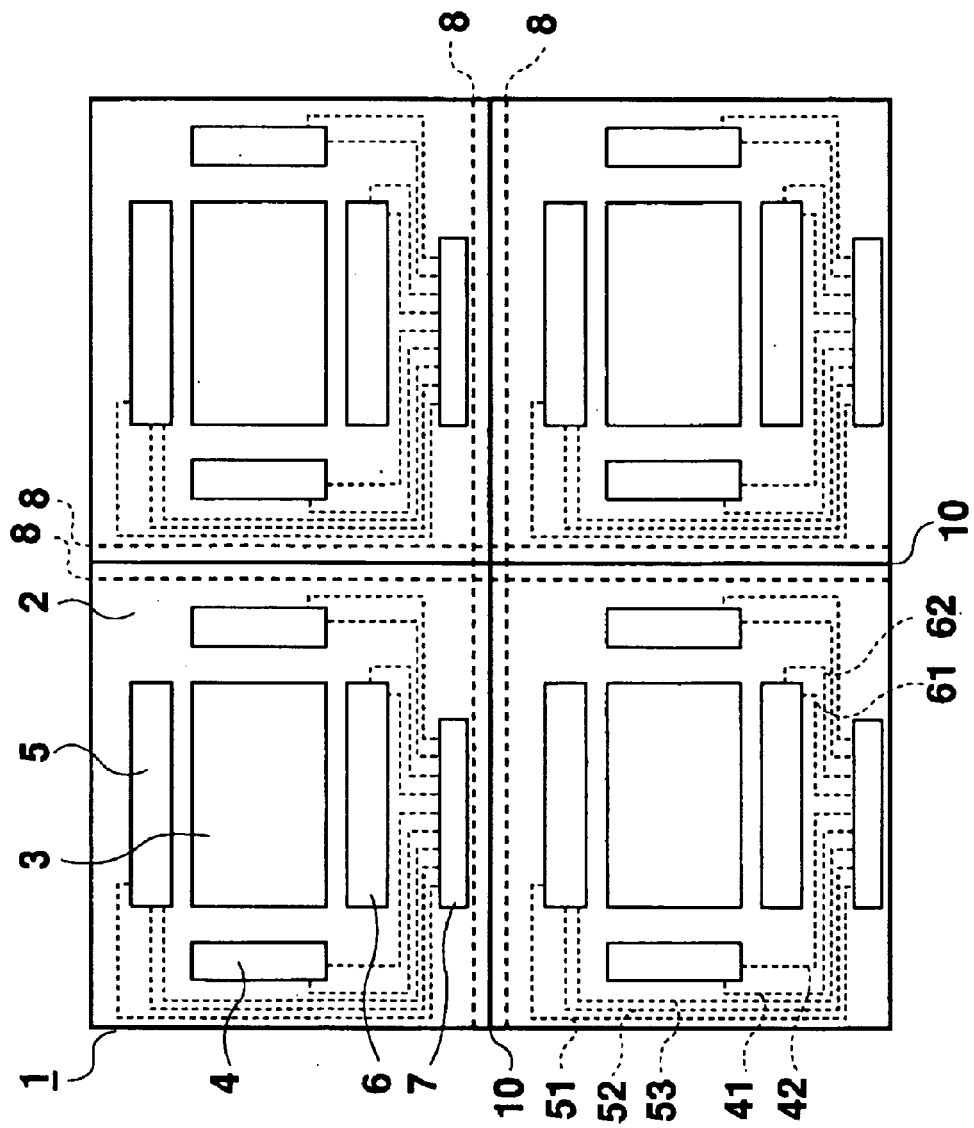
FIG. 9 is a plan view showing a mother substrate of a display apparatus according to a seventh preferred embodiment of the present invention.

Referring to FIG. 9, which is a plan view showing a mother substrate 1 of a driver-integrated LCD according to a seventh preferred embodiment of the present invention, at the beginning of the film formation process, a dedicated region for an electric shielding wire 10 is provided on the mother substrate 1 between adjacent active matrix substrates 2, which is then cut when finished active matrix substrates 2 are separated. This embodiment may be employed when active matrix substrates 2 occupy a relatively small region on the mother substrate 1 so that a sufficient region can be ensured for provision of an electric shielding wire 10.

In this embodiment, independent electric shielding wires do not remain in finished LCDs, so image display is not affected by the electric shielding wire.

Figure 10:
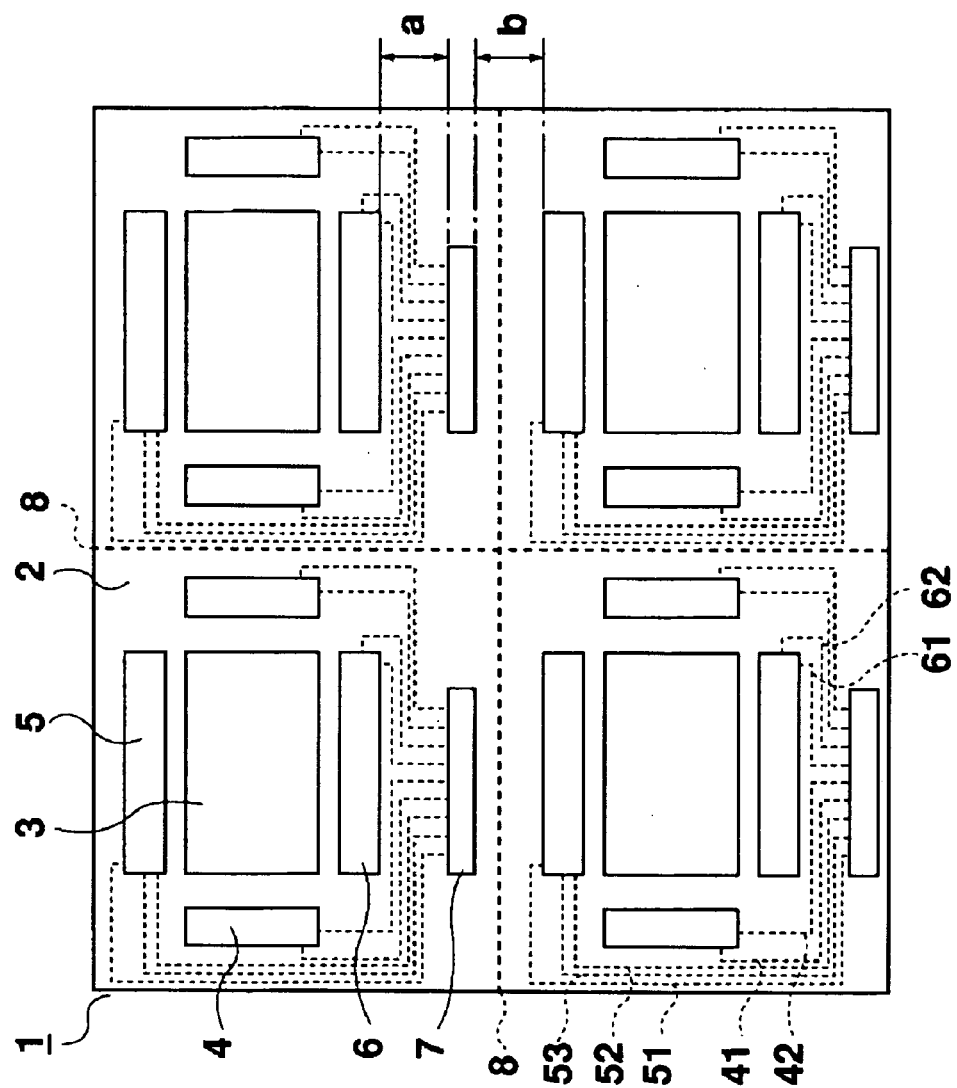
FIG. 10 is a plan view showing a mother substrate of a display apparatus according to an eighth preferred embodiment of the present invention.
Figure 11:
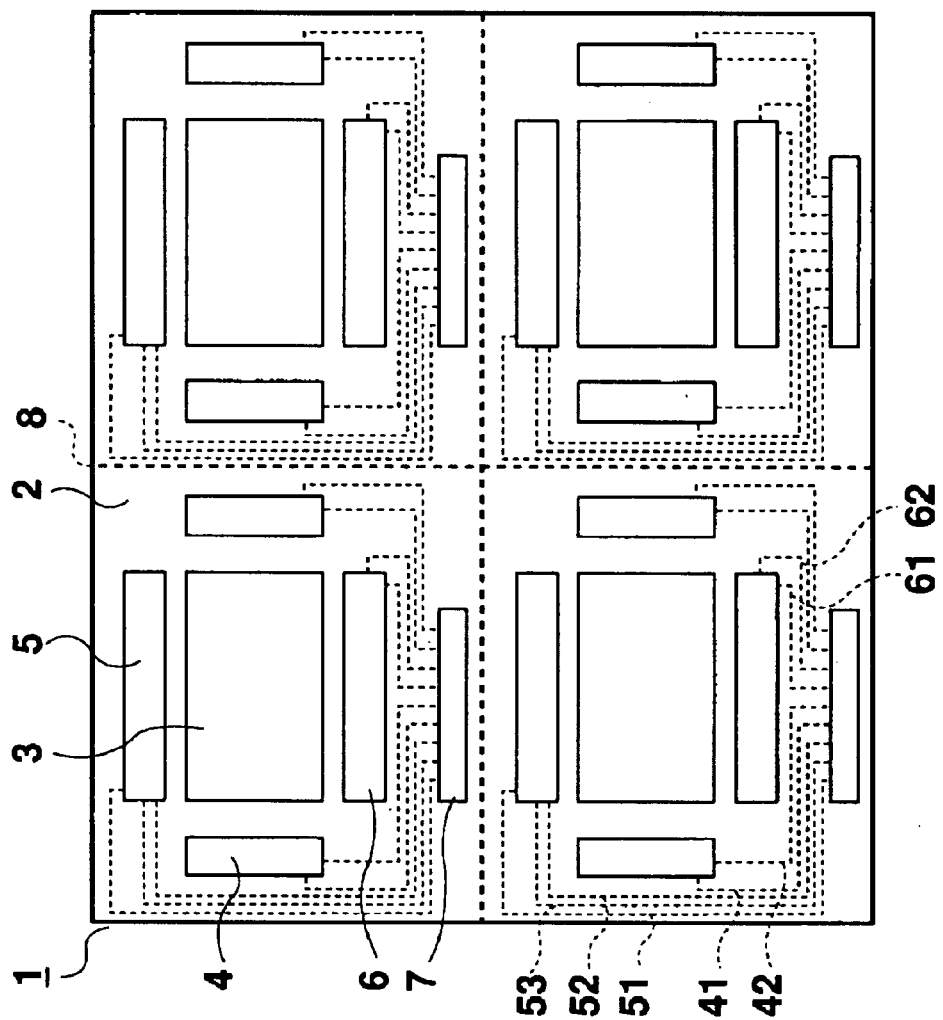
FIG. 11 is a plan view showing a mother substrate of a conventional display apparatus.
Figure 12:
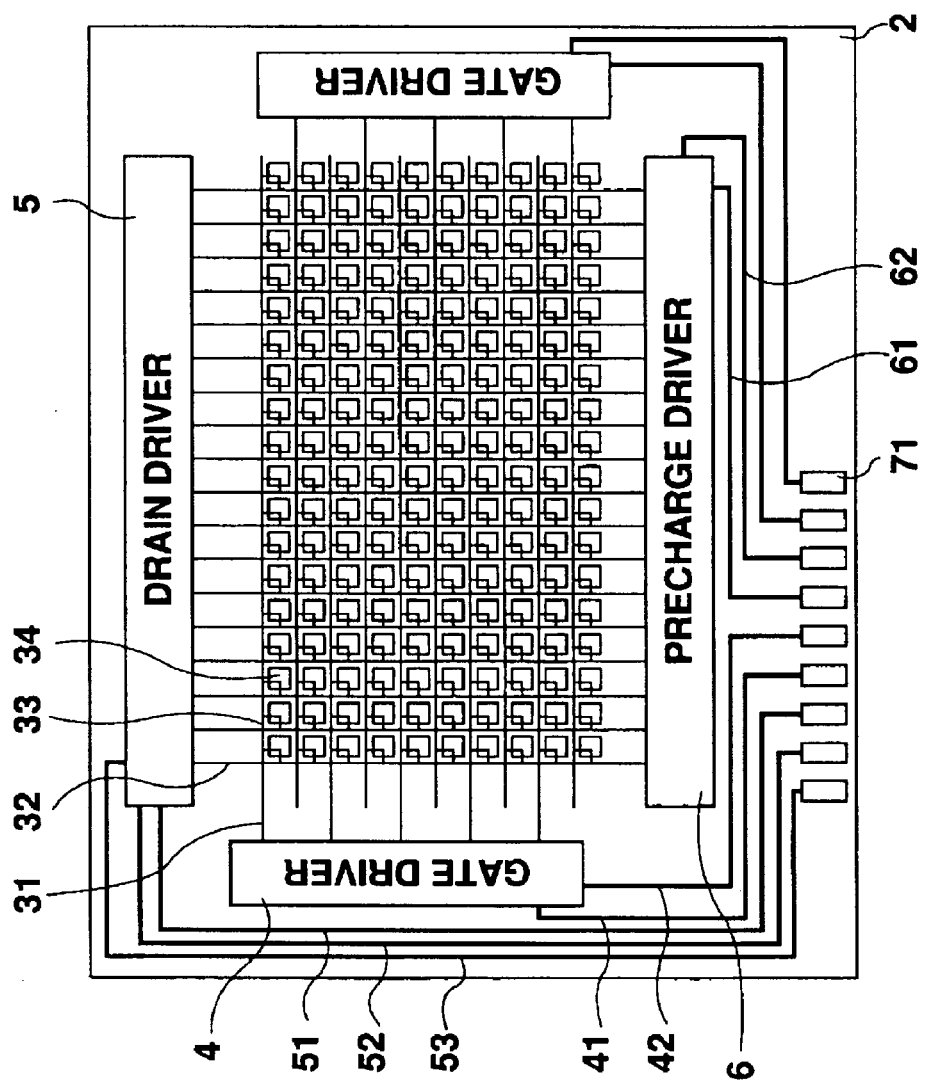
FIG. 12 is a plan view showing a active matrix substrate for a conventional display apparatus.
Figure 13:
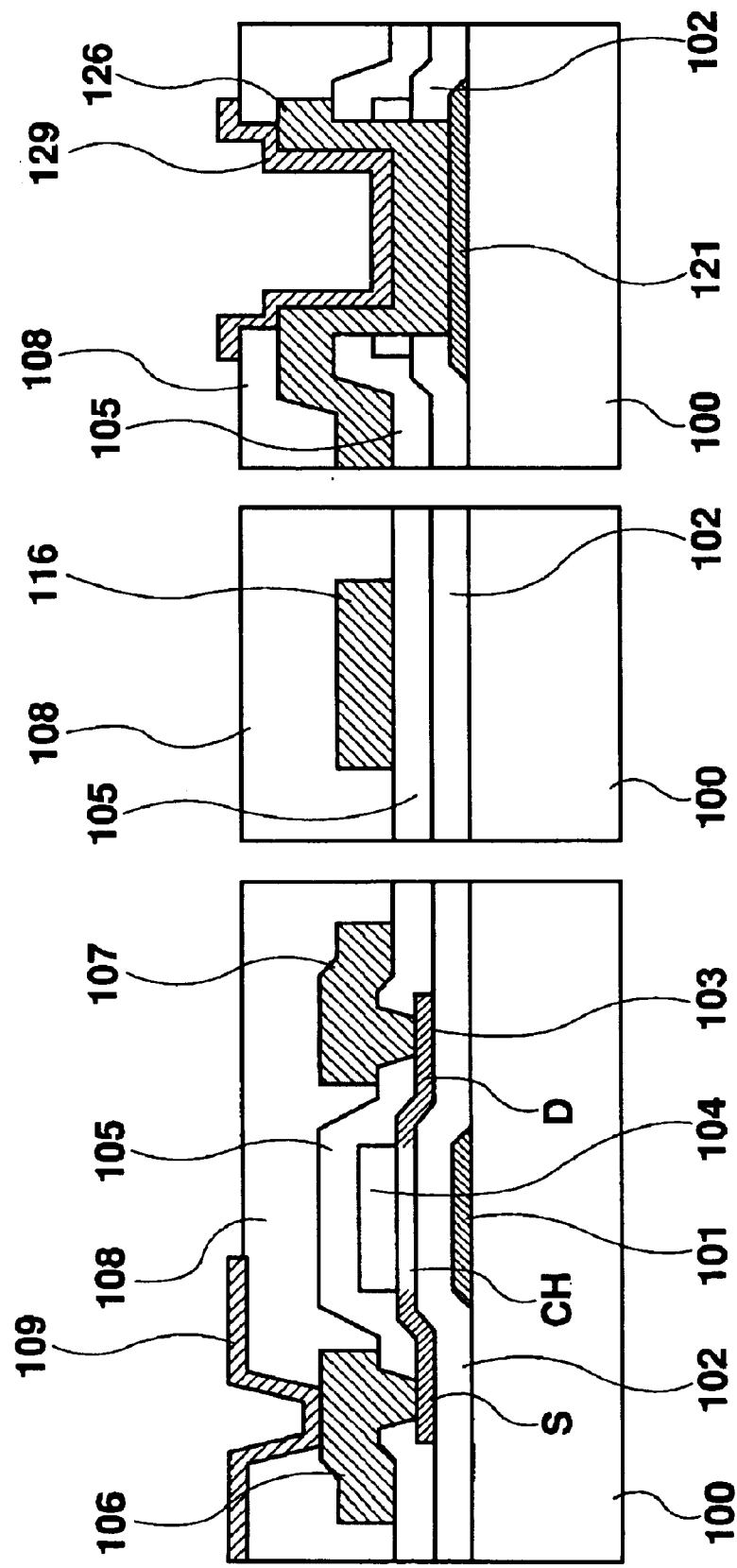
FIG. 13 is a cross sectional view showing (major ?) part of a active matrix substrate for a conventional display apparatus.

Referring to FIG. 10, which is a plan view showing a mother substrate 1 of a driver-integrated LCD according to an eighth preferred embodiment of the present invention, the input terminal area 7 is positioned 800 $\mu$m or more, and preferably 1800 $\mu$m or more, away from the precharge driver 6 (a separation distance a) and the drain driver 5 of the adjacent active matrix substrate 2 (a separation distance b).

The following table shows the frequency of defect occurrence to a mother substrate 1 relative to the smaller one of the separation distances a and b.

TABLE 1

| Separation Distance (a, b) | Defect Frequency (%) |
| --- | --- |
| 700 $\mu$m | 13.7% |
| 800 $\mu$m | 2.8% |
| 1800 $\mu$m | 0.1% |

Referring to this table, it can be seen that, when the separation distance a or b is 700 $\mu$m, defects will be caused to the precharge driver 6 or the drain driver 5 of the adjacent active matrix substrate 2 with high frequency, or 13.7%. The frequency drops significantly to 2.8% when the separation distance a or b is 800 $\mu$m, and further drops to 0.1% when the distance is 1800 $\mu$m, which is a value small enough that the effect of discharged electricity from a charged input terminal area 7 can almost be neglected. In view of yield and costs, defect frequency due to the same cause needs to be suppressed below 1 to 2%, at best 3%. Therefore, according to the table, a driver must be situated, at the closest, 800 $\mu$m or more, and preferably 1800 $\mu$m or more, away from the input terminal area 7.

As described above, according to the present invention, a wire for protection against static electricity can be provided at a relatively early manufacturing stage for a display apparatus substrate. As a result, elements can be protected against static electricity generated in the manufacturing process. This can resultantly increase manufacturing yield.

What is claimed is:

1. A display apparatus having a plurality of pixels, comprising on a substrate:

a plurality of pixel electrodes corresponding to respective pixels among the plurality of pixels;

a plurality of driving thin film transistors, each located outside of said plurality of pixel electrodes and comprising a plurality of conductive layers, for controlling supplying of signal voltage to the plurality of pixel electrodes;

a plurality of input terminals for receiving a control signal for the signal voltage to be supplied to the plurality of driving thin film transistors; and wires, at least some of said wires being connected between said plurality of driving thin film transistors and said plurality of input terminals for sending the signal voltage from the plurality of input terminals to the plurality of driving thin film transistors, wherein each of the wires includes a first conductive layer formed of the lowest conductive layer of the driving thin film transistor and a second conductive layer situated above the first conductive layer and formed of other conductive layer of the driving thin film transistor, at least a portion of one of said wires being located near the peripheral area of the substrate and outside of said plurality of driving thin film transistors to function as an electric shield for said plurality of driving thin film transistors.

2. The display apparatus of claim 1, further comprising a plurality of switching thin film transistors located in a display area, and a driving circuit located outside of the display area for receiving signals from the wires, the driving circuit including the driving thin film transistors.

3. The display apparatus of claim 2, wherein at least one side of the driving circuit is adjacent a part of the wires.

* * * * *